United States Patent
Yoon et al.

(10) Patent No.: US 7,012,593 B2
(45) Date of Patent: Mar. 14, 2006

(54) GLOVE-TYPE DATA INPUT DEVICE AND SENSING METHOD THEREOF

(75) Inventors: Sung-Pyo Yoon, Songnam-shi (KR); Ki-Tae Lee, Taegu-Kwangyokshi (KR); Chang-Hwan Hwang, Koyang-shi (KR); Sang-Jun Park, Seoul (KR)

(73) Assignee: Samsung Electronics Co., Ltd., (KR)

( * ) Notice: Subject to any disclaimer, the term of this patent is extended or adjusted under 35 U.S.C. 154(b) by 157 days.

(21) Appl. No.: 10/173,478

(22) Filed: Jun. 17, 2002

(65) Prior Publication Data

US 2003/0011568 A1    Jan. 16, 2003

(30) Foreign Application Priority Data

Jun. 15, 2001 (KR) ............................... 2001-34036
Aug. 9, 2001 (KR) ............................... 2001-48063

(51) Int. Cl.
*G06F 17/20* (2006.01)

(52) U.S. Cl. ...................... 345/156; 345/158; 345/162; 345/169; 340/407.1; 340/497.2; 463/39; 704/3; 704/270; 704/272

(58) Field of Classification Search ................ 345/156, 345/157, 158, 162, 169, 189; 340/402.1, 340/407.2, 407.1; 341/20, 21, 22; 463/36, 463/37, 39, 43; 704/3, 270, 271, 272, 275
See application file for complete search history.

(56) References Cited

U.S. PATENT DOCUMENTS

| | | | | |
|---|---|---|---|---|
| 4,414,537 A | * | 11/1983 | Grimes ......................... | 341/20 |
| 4,613,139 A | * | 9/1986 | Robinson, II ................ | 463/37 |
| 4,988,981 A | * | 1/1991 | Zimmerman et al. ....... | 345/158 |
| 5,339,799 A | * | 8/1994 | Kami et al. .................. | 600/117 |
| 5,486,112 A | * | 1/1996 | Troudet et al. .............. | 434/250 |
| 5,514,861 A | * | 5/1996 | Swartz et al. .......... | 235/462.44 |
| 5,794,639 A | * | 8/1998 | Einbinder ..................... | 135/67 |
| 6,012,926 A | * | 1/2000 | Hodges et al. .............. | 434/236 |
| 6,141,643 A | * | 10/2000 | Harmon ....................... | 704/271 |

* cited by examiner

*Primary Examiner*—Ricardo Osorio
*Assistant Examiner*—Vincent E. Kovalick
(74) *Attorney, Agent, or Firm*—Dilworth & Barrese LLP (57) ABSTRACT

A glove-type data input device and a sensing method thereof. In the data input device shaped into a glove, a sensor unit senses the change of a glove shape or a position change, and the resulting pressure at at least one contact surface, and outputs a predetermined sensing signal according to the sensing. An analyzer determines input data by analyzing the sensing signal. An output port outputs the determination result to an external terminal.

9 Claims, 11 Drawing Sheets

GLOVE-TYPE DATA INPUT DEVICE AND SENSING METHOD THEREOF

PRIORITY

This application claims priority to an application entitled "Glove-Type Data Inputting Apparatus" filed in the Korean Industrial Property Office on Jun. 15, 2001 and assigned Ser. No. 2001-34036, and an application entitled "Glove-Type Data Inputting Apparatus and Recognition Method Thereof" filed in the Korean Industrial Property Office on Aug. 9, 2001 and assigned Ser. No. 2001-48063, the contents of both of which are hereby incorporated by reference.

BACKGROUND OF THE INVENTION

1. Field of the Invention

The present invention relates generally to a data input device and a sensing method thereof, and in particular, to a glove-type data input device and a sensing method thereof.

2. Description of the Related Art

For data input, an external input device such as a keyboard, a mouse, or a joystick can be connected to a wireless terminal, but it is inconvenient to carry them along with the wireless terminal. A built-in data input device must be designed with smaller finger-touch areas due to the trend of miniaturization of terminals. As a result, internal input devices including small-size keypads are not easy to manipulate because the internal data input devices are too small for a user's hand. Specifically, if a user's finger is too big, a wrong key may be pressed.

SUMMARY OF THE INVENTION

It is, therefore, an object of the present invention to provide an easy-to-use portable data input device and a sensing method thereof.

To achieve the above and other objects, there are provided a glove-type data input device and a sensing method thereof. In the data input device shaped into a glove, a sensor unit senses the change of a glove shape or a position change, and the resulting pressure at at least one contact surface, and outputs a predetermined sensing signal according to the sensing. An analyzer determines input data by analyzing the sensing signal, and an output port outputs the determination result to an external terminal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Figure 1:
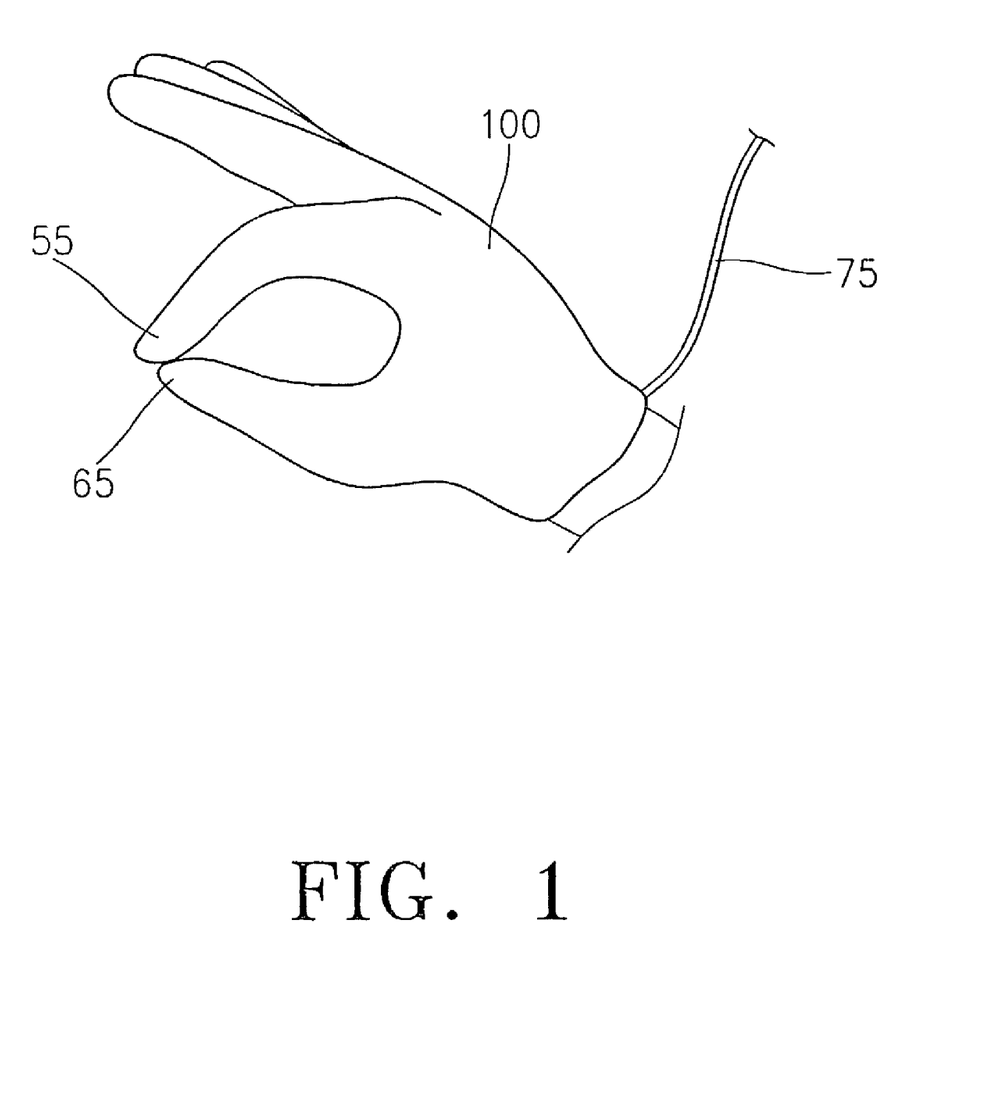
FIG. 1 illustrates a configuration of a glove-type data input device according to the present invention.

FIG. 1 illustrates a configuration of a glove-type data input device according to the present invention. In FIG. 1, the tips of the thumb 65 and the index finger 55 of the glove-type data input device 100 are brought into contact and the pressure is sensed by a sensor (not shown).

Figure 2:
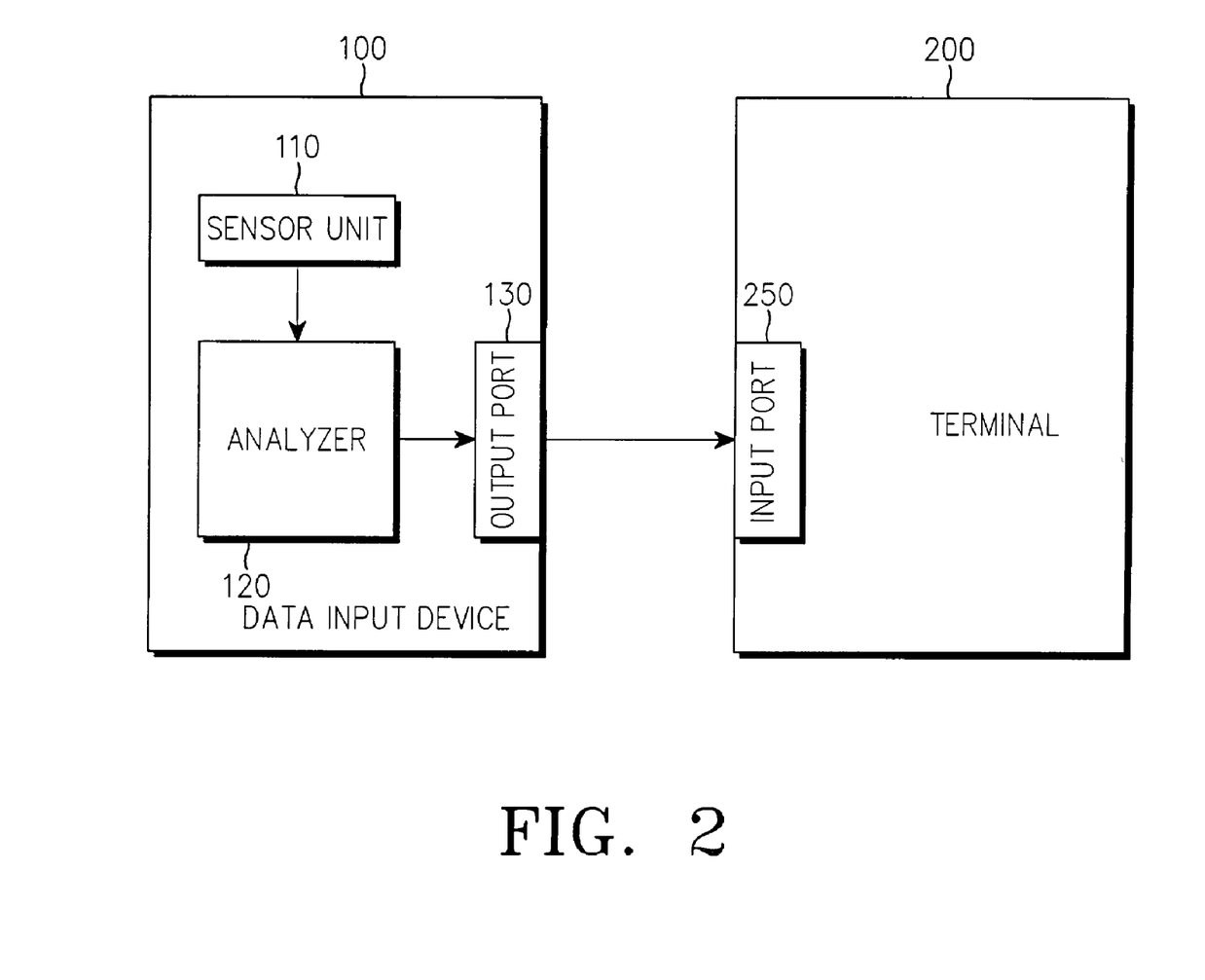
FIG. 2 is a block diagram of an embodiment of the glove-type data input device connected to a terminal by a cable according to the present invention.

FIG. 2 is a block diagram of an embodiment of the glove-type data input device connected to a terminal by a cable according to the present invention. Referring to FIG. 2, the glove-type data input device 100 includes a sensor unit 110, an analyzer 120, and an output port 130. The sensor unit 110 senses a change in glove shape or pressure sensed position according to the motion of the glove (i.e., the glove-type data input device 100) and the resulting pressure from at least one finger-touch area (i.e., a change in resistance or conductance), and outputs a corresponding analog sensing signal.

When a user moves his finger position for data input on a predetermined pad, a position change is sensed. A glove shape change occurs in situations where finger-tips contact each other or the user clenches his fist.

The analyzer 120 determines what data has been input by analyzing the sensing signal and feeds the determination result to a terminal 200. The analyzer 120 may include a microprocessor and a database having data corresponding to each sensing signal.

The glove-type data input device 100 is provided with an internal power supply (not shown) for supplying an operating voltage. Obviously, an external power supply may substitute for the internal one.

The terminal 200 receives data from the glove-type data input device 100 via its input port 250. The terminal 200 can be a small-size wireless terminal like a portable phone, or a wired terminal like a personal computer or video game console.

Figure 3:
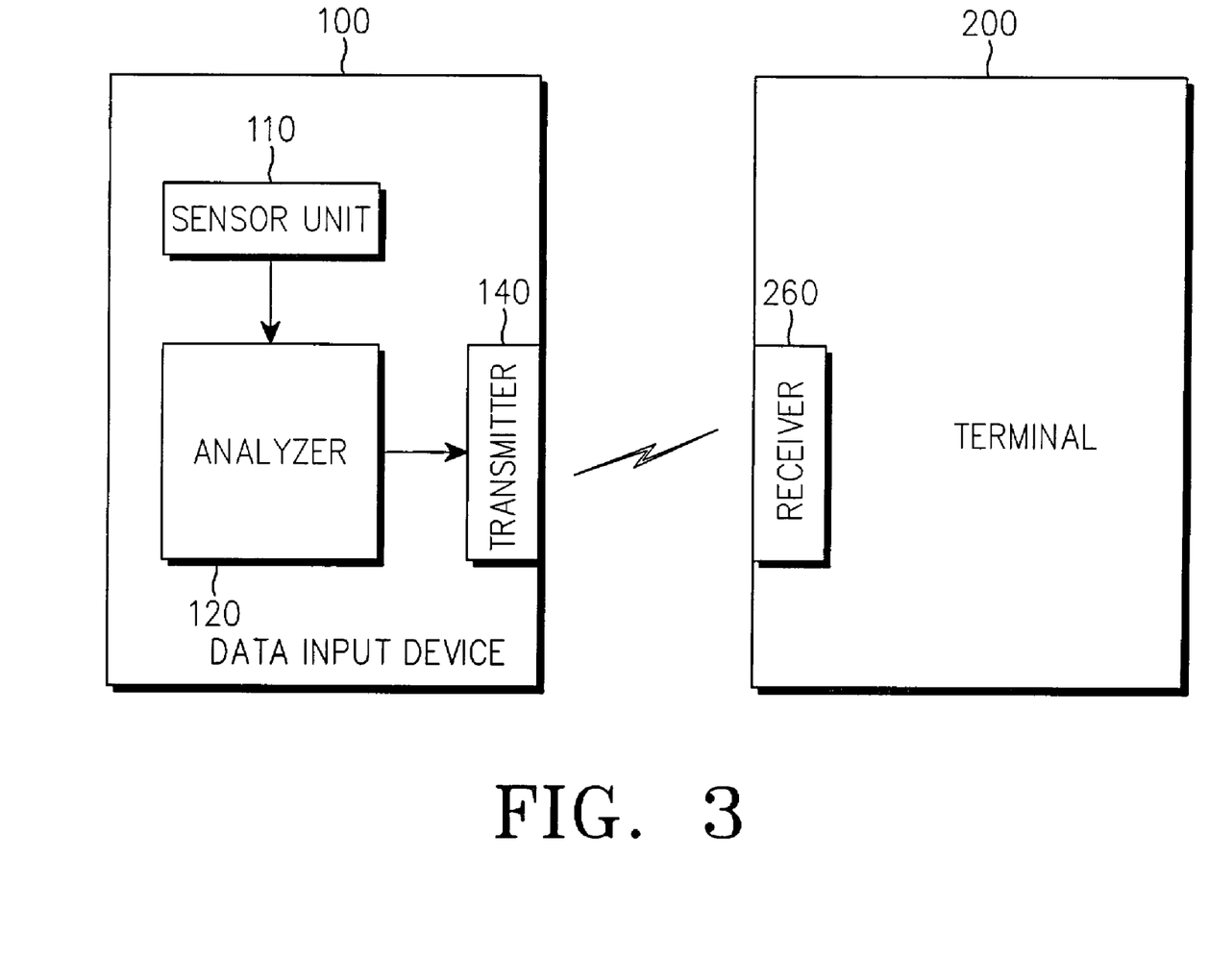
FIG. 3 is a block diagram of the glove-type data input device illustrated in FIG. 2 connected wirelessly to the terminal.

FIG. 3 is a block diagram of the glove-type data input device illustrated in FIG. 2 connected wirelessly to the terminal. Referring to FIG. 3, the glove-type data input device 100 has a wireless transmitter 140 and the terminal 200 has a wireless receiver 260, so that they can be connected wirelessly.

Figure 4:
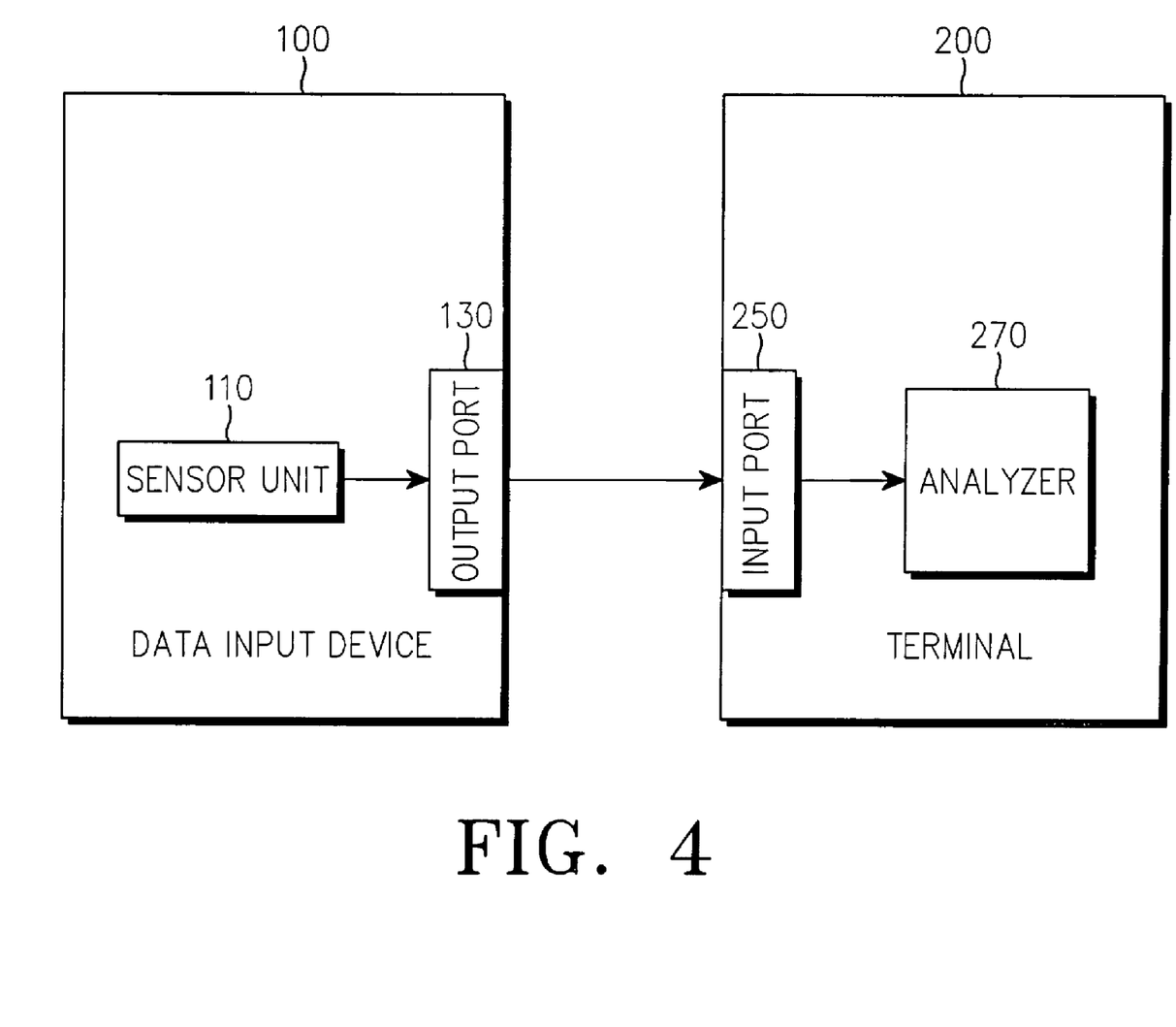
FIG. 4 is a block diagram of another embodiment of the glove-type data input device connected to the terminal by a cable according to the present invention.
Figure 5:
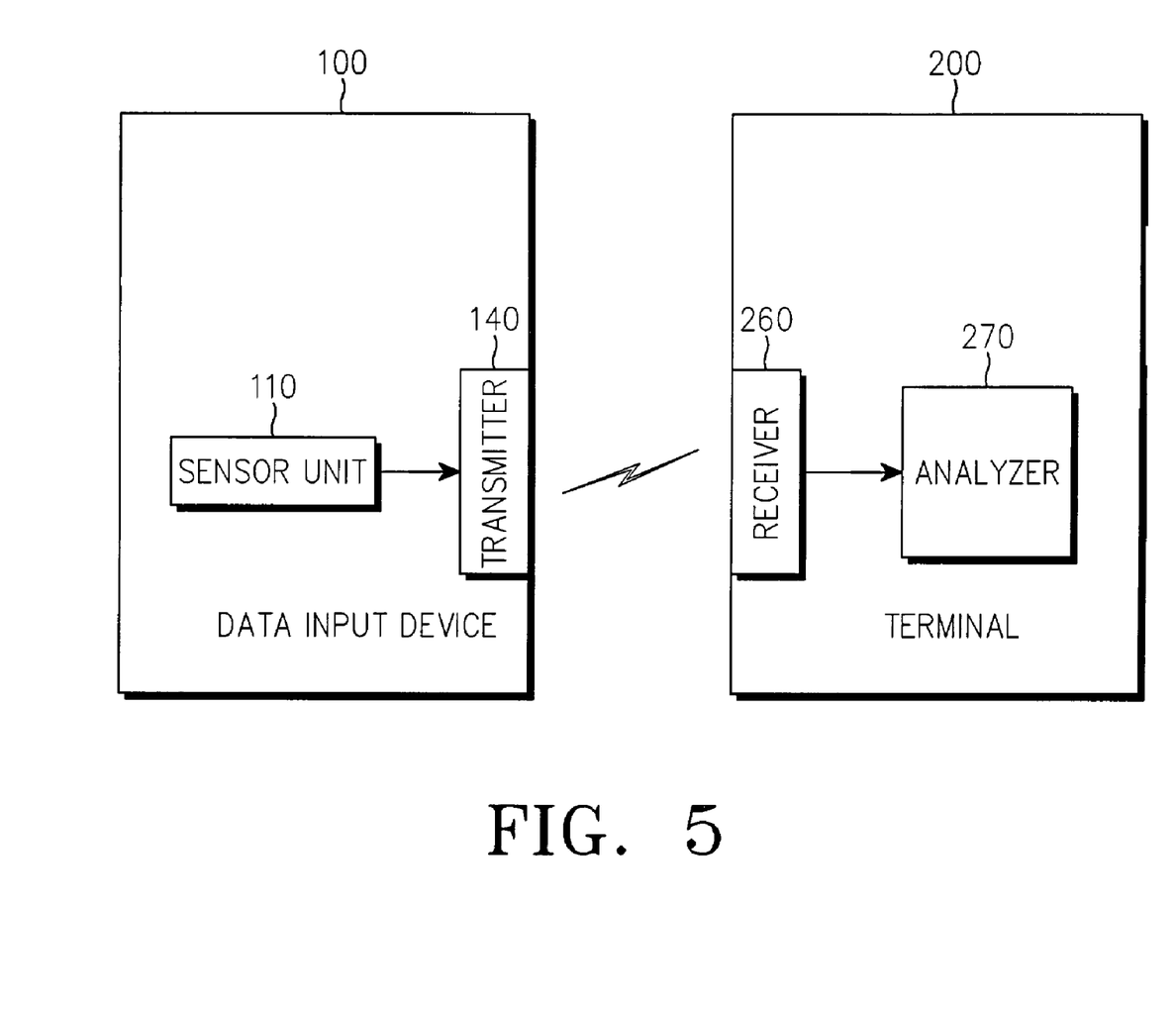
FIG. 5 is a block diagram of the glove-type data input device illustrated in FIG. 4 connected wirelessly to the terminal.

FIG. 4 is a block diagram of another embodiment of the glove-type data input device connected to the terminal by a cable according to the present invention, and FIG. 5 is a block diagram of the glove-type data input device illustrated in FIG. 4 connected wirelessly to the terminal. As compared to the first embodiment of the present invention, the terminal 200 is provided with an analyzer 270. In this case, the glove-type input device 100 needs a means for converting an analog signal output from the sensor unit 110 to a digital signal, which is well known to those skilled in the art.

Figure 6:
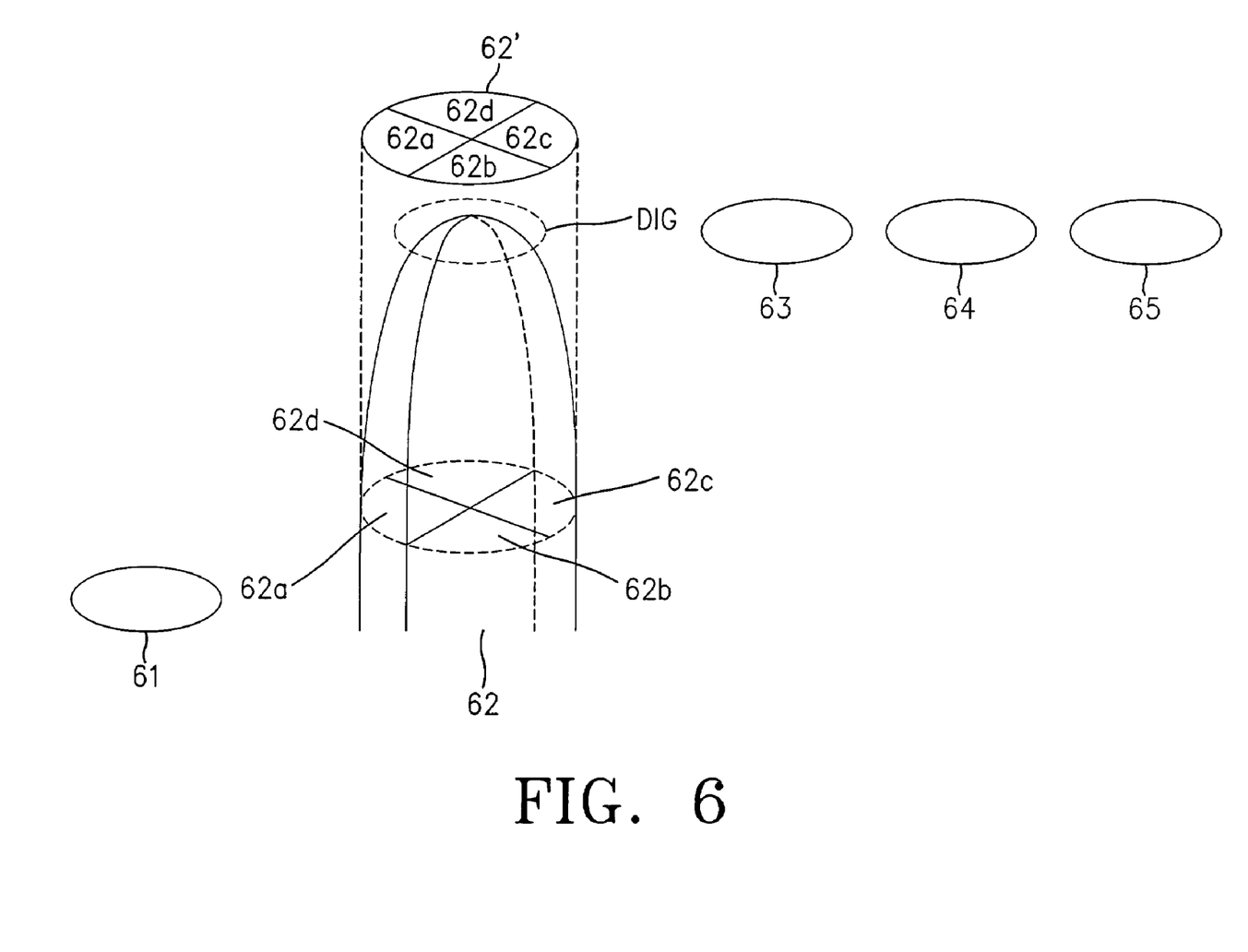
FIG. 6 illustrates a structure of a sensor unit used in the glove-type data input devices according to the embodiments of the present invention.

FIG. 6 illustrates a structure of the sensor unit used in the glove-type input devices according to the embodiments of the present invention. Referring to FIG. 6, sensors 61 to 65 are located on the tips of the fingers. At least one of the five sensors, for example, the sensor 62 is designated as a direction sensor. Reference numeral 62' denotes a cross section of the sensor 62. The sensor 62 includes four sensor tips 62a to 62d for sensing four directions, left, right, up and down. DIG denotes a finger area that is pressed and not directional input but digital input is sensed. Considering the motion characteristics of the fingers, the direction sensor is assigned to the index finger. The direction sensor will be referred to as an analog input mode sensor and the other sensors, digital input mode sensors.

In a digital input mode, the analog input mode sensor 62 operates in the same manner as the digital input mode sensors 61, 63, 64 and 65. The analog input mode sensor 62 is so configured that its sensor tips, each sensing one direction, surround the index finger.

The analyzer 120 illustrated in FIGS. 2 to 5 determines whether an input mode is an analog mode or a digital mode by combining signals received from the sensors 61 to 65, converts the signals according to the determined input mode, and feeds the converted signals to the terminal 200.

Figure 7:
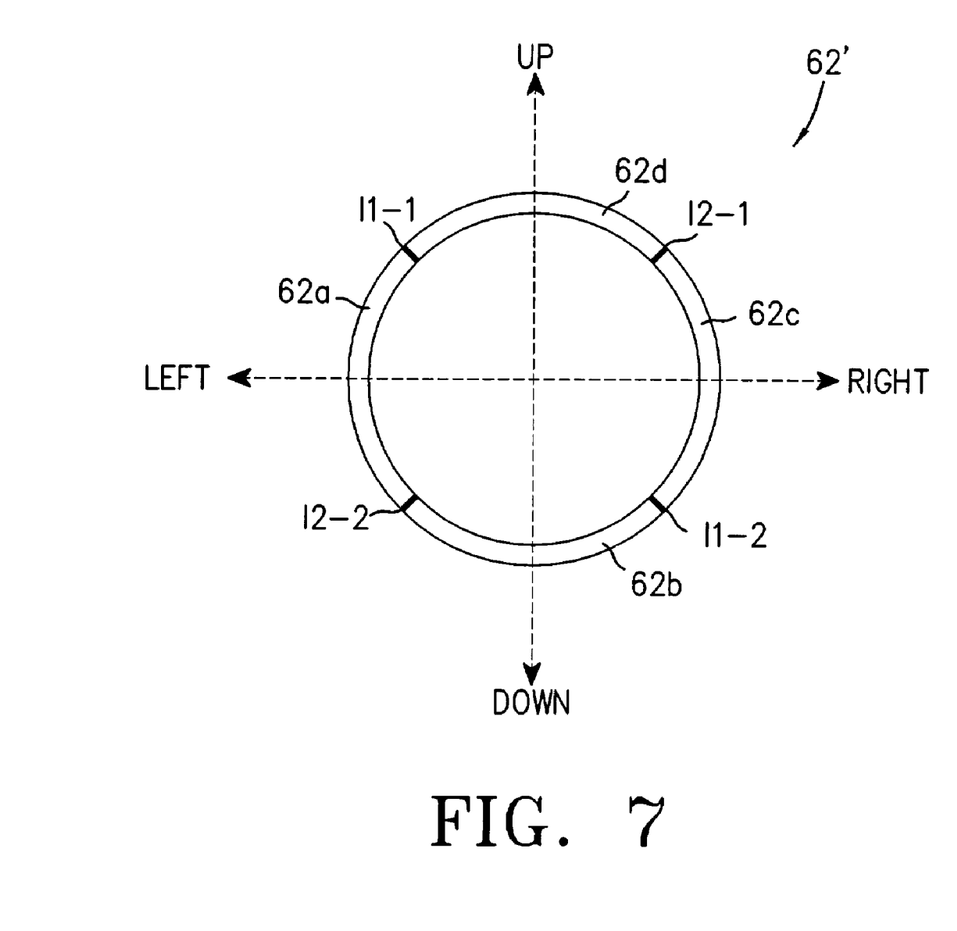
FIG. 7 is a sectional view of an analog input mode sensor illustrated in FIG. 6.

FIG. 7 illustrates the cross section 62' of the analog input mode sensor 62 illustrated in FIG. 6. As described above, the sensor tips 62a to 62d of the analog input mode sensor 62 surround the index finger. Reference numerals 11-1, 12-1, 12-2 and 11-2 denote the boundaries between the sensor tips 62a to 62d.

Figure 8A:
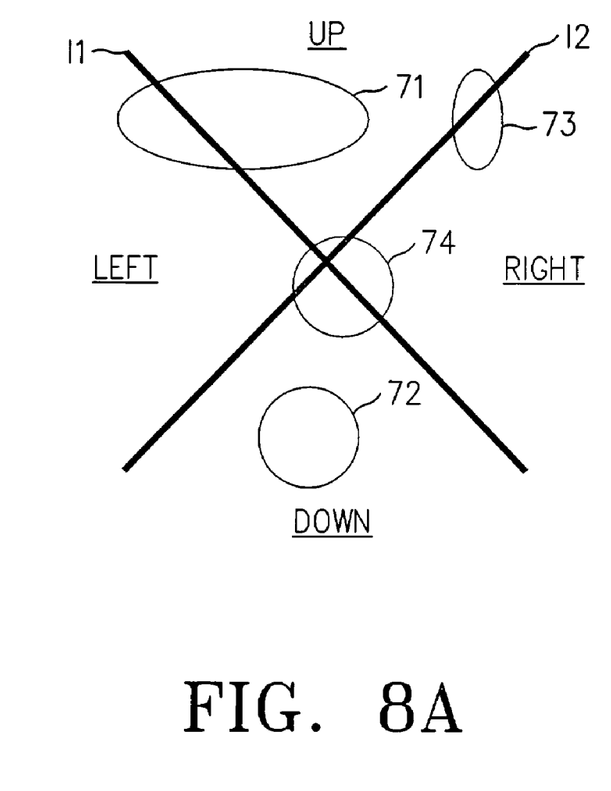
FIGS. 8A and 8B illustrate scroll directions according to areas over which the analog input mode sensor illustrated in FIG. 7 is pressed.
Figure 8B:
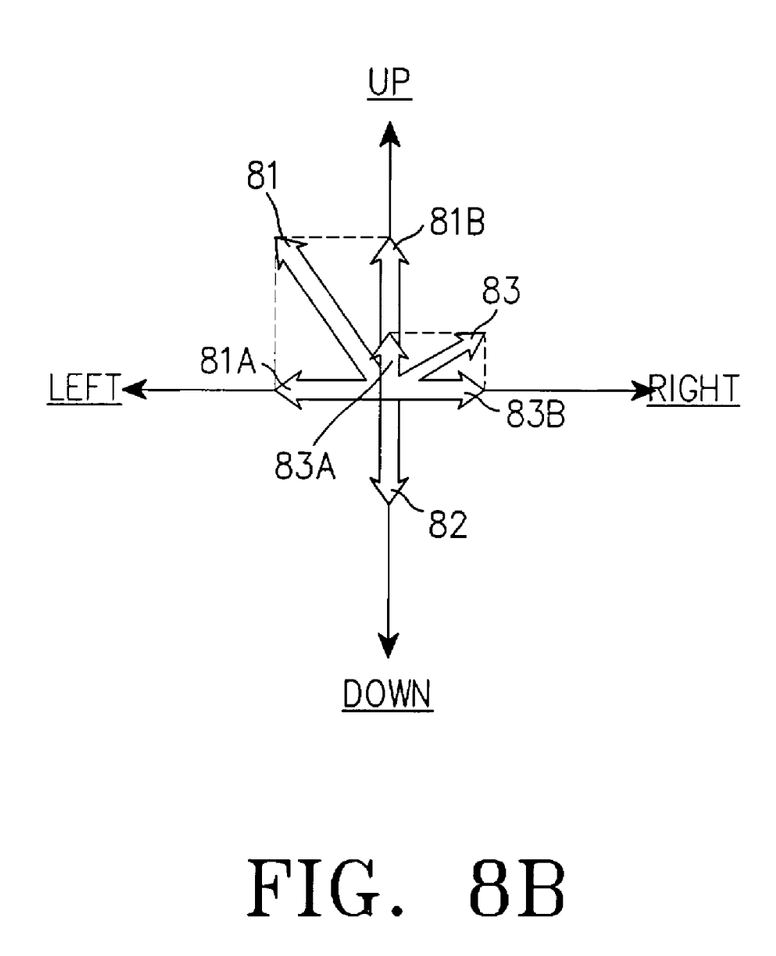

FIGS. 8A and 8B illustrate scroll directions according to the sizes of areas over which the analog input mode sensor 62 illustrated in FIG. 7 is pressed;

Referring to FIG. 8A, pressures are sensed in an upper-left area 71, a lower area 72, and a right-upper area 73, with different sizes as illustrated. A predetermined area including the intersection point between bold solid lines 11 and 12 that define four sensing areas, up, down, left and right, corresponds to the area DIG, illustrated in FIG. 6. The line 11 connects the boundary 11-1 to the boundary 11-2. In correspondence to the finger shape, the sensor tips 62a to 62d are tapered so that they are fit for the finger.

Referring to FIG. 8B, the pressure sensed at the upper-left area 71 can be expressed as the sum 81 of a left vector 81A and an up vector 81B. In the direction of the vector sum 81, the index finger actually moved. Similarly, the pressure sensed at the right-upper area 73 can be expressed as the sum 83 of an up vector 81B and a right vector 83B. the index finger actually moved In the direction of the vector sum 83. The pressure sensed at the lower area 72 has only a down vector 82. As noted from FIG. 8B, the vector sum increases with the size of the pressed area. This implies that as the user presses his finger over a wider area, the finger moves a longer distance.

Figure 9:
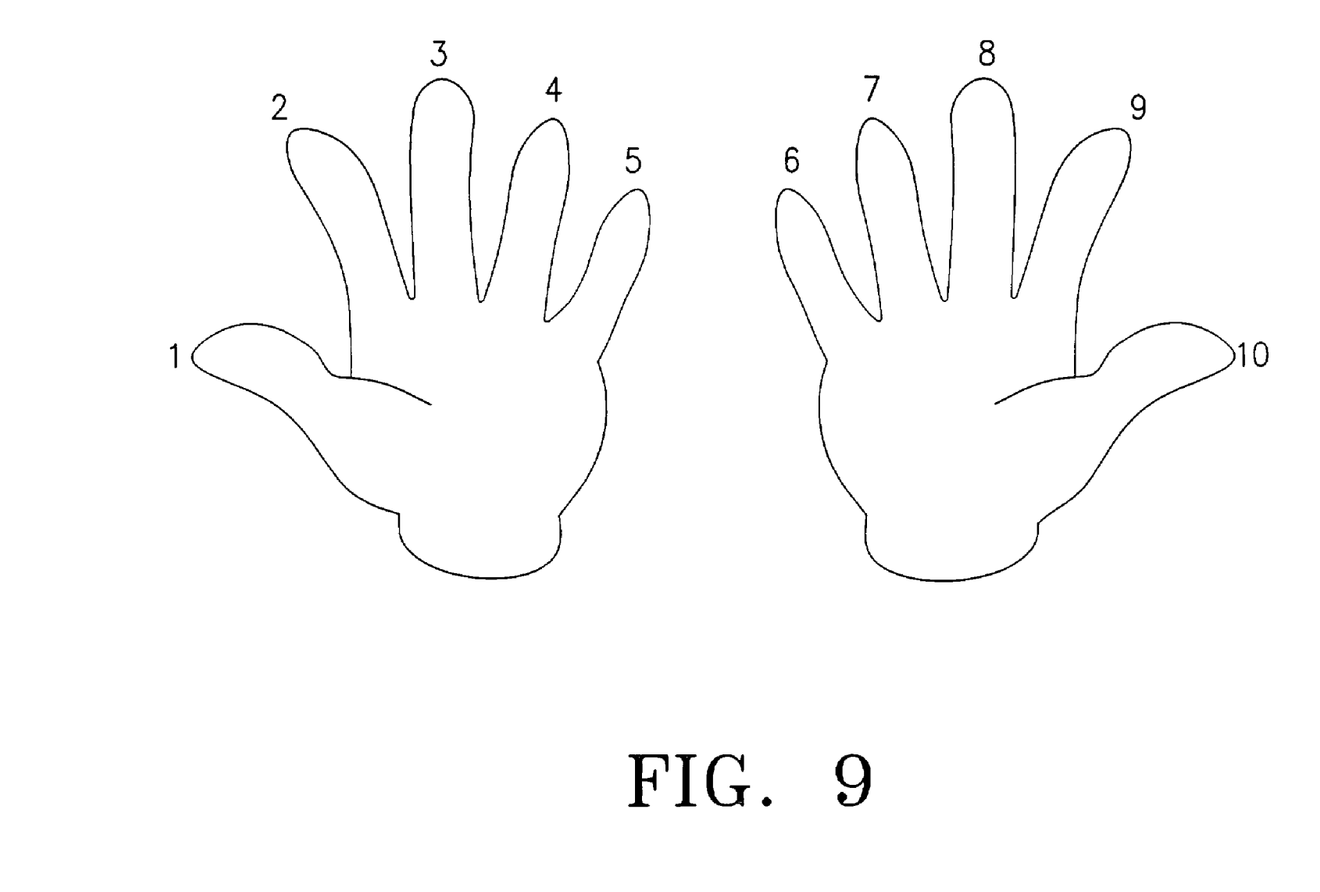
FIG. 9 depicts sensors of two glove-type data input devices worn on both hands, which are used in combination to produce key inputs.

FIG. 9 illustrates two glove-type data input devices having sensors, worn on both hands, which are used in combination to produce key inputs according to the present invention. In FIG. 9, each finger has one sensor. Herein below, a detailed description will be made of input mode definition, input mode determination, and mode conversion.

Input Mode Conversion

The user converts an analog or digital input mode to the other input mode according to what data the user is to input. Upon input of only analog data from the analog input mode sensor 62, the glove-type input device operates in the analog input mode. If data received from the analog input mode sensor 62 turns out to be digital data during operation in the analog input mode, the analog input mode is converted to the digital input mode. Similarly, when the analyzer 120 determines that input data is analog data during processing in the digital input mode, the data is processed in the analog input mode. The analog data includes directional data such as the movement of a mouse pointer, and the digital data includes data corresponding to input of digit keys, character keys, and function keys in a keyboard.

Analog Input Mode

For Internet browsing, for example, scrolling and clicking are needed as is done with a mouse. In this case, scroll directions and scroll speeds can be set according to the pressures of the sensor tips 62a to 62d of the analog input mode sensor 62. This implies that the glove-type data input device operates in the analog input mode.

A vector sum is calculated to determine a scroll direction. If pressure is applied to only one of the four sensor tips 62a to 62d, it is determined that the finger movement was made in the direction the pressed sensor tip indicates. On the other hand, if pressure is applied to two sensor tips, it is determined that the finger movement was made in a direction corresponding to the vector sum of the directions the two sensor tips indicate. Here, the direction vector and the speed at which the finger moves increase in proportion to the size of the pressed area. In other words, when the finger presses the sensor tips strongly, a fast scrolling is made, and when the finger presses them slightly, a slow scrolling is made, If three or four sensor tips are pressed, the analog input mode is converted to the digital input mode, for processing key inputs.

More sensors can be used to sense directions and pressure more accurately, and the user can set the sensitivity of the sensors.

Digital Input Mode

When text data is to be entered to write an e-mail, for example, the glove-type input device operates using the sensors in the digital input mode. If 10 sensors are given as illustrated in FIG. 9, the sensors are used in combination to input a variety of characters.

In the present invention, digital inputs are produced by combining four parameters, i.e., a combination of sensors pressed simultaneously, the number of sensor pressings, the duration of sensor pressing, and the pressure applied to a sensor. By combining the four parameters, the user or manufacturer can produce a key input. The input data is stored in a memory (not shown) of the analyzer 120. How the four parameters can be combined and what key input the combinations produce will be described below.

1) Pressure: two pressure levels are defined. If an input signal exceeds a first pressure level, it is determined that an input signal has been received and the input signal is processed as a small letter in the case of the English language, and as a single-consonant/single-vowel letter in the case of the Korean language. If the input signal exceeds a second pressure level, it is processed as a capital letter in the case of the English language and as a double-consonant/double-vowel letter in the case of the Korean language.

2) The number of sensor pressings: the keys in a general keyboard are matched to the fingers according to the positions of the keys. A plurality of characters can be assigned to each finger. For example, if "ㅂ", "ㅁ" and "ㅋ" are assigned to finger #5 in FIG. 9, the user touches finger #5 on the pad once for "ㅂ", twice for "ㅁ", and three times for "ㅋ". The letters "ㅂ", "ㅁ" and "ㅋ" are replaced with "q", "a" and "z" in the case of English. It is to be noted here that the time between pressings is limited to a predetermined value. Only if successive inputs are made within a limited time, the inputs are converted to a corresponding letter. If the inputs are not made until the limited time is expired, it is determined that a new character has been input.

3) The duration of sensor pressing: functions can be invoked rapidly by use of short keys. Mapping the short keys to the functions is programmable by the user. The programmed values are stored in the memory of the analyzer 120. If a sensor is pressed longer than a predetermined time, it is determined that a short key is selected and thus a corresponding function is invoked. Since there are 10 sensors in the example illustrated in FIG. 9, 10 short keys can be designated to them. For example, dialing, SMS (Short Message Service), and phone book functions can be assigned to fingers #1, 2 and 3 respectively.

4) Combinations of sensors: function keys can be defined by combining sensors. If sensor #9 is set as an analog input mode sensor and used to scroll like a mouse, sensors #1, 2 and 3 may function as Ctrl, Shift, and Alt keys. Besides, if sensors #8 and 9 are pressed at the same time with sensor #1 pressed, an Enter key can be input. The user or manufacturer can map combinations of the sensors to key inputs and the mappings are stored in the memory of the analyzer 120.

Figure 10:
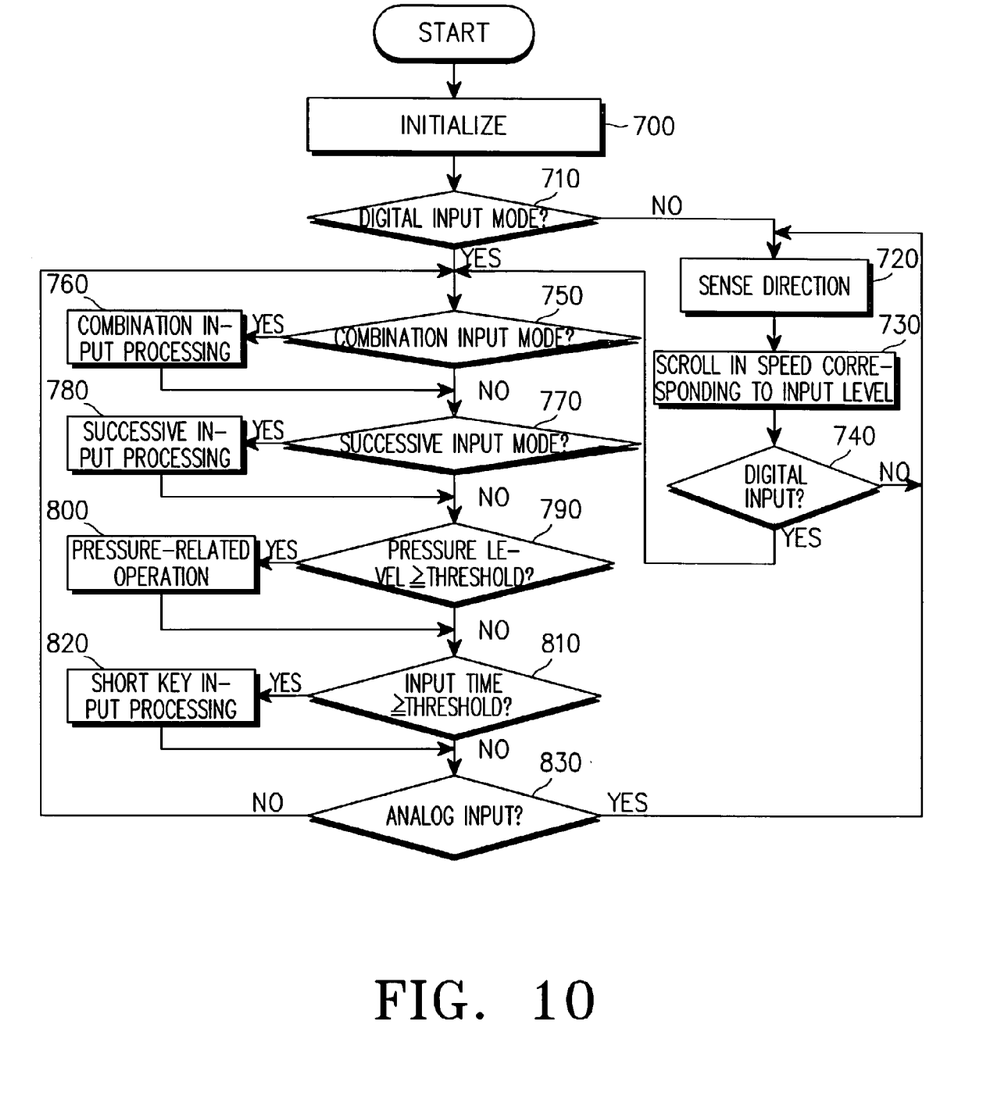
FIG. 10 is a flowchart illustrating the operation of an analyzer used in the glove-type data input devices according to the embodiments of the present invention.

FIG. 10 is a flowchart illustrating the operation of an analyzer 120 according to the present invention. Referring to FIG. 10, when the glove-type data input device is connected to the terminal, the glove-type data input device is initialized in step 700 and the analyzer 120 determines whether its input mode is a digital input mode in step 710. If the input mode is not a digital input mode, the analyzer 120 senses a scroll direction in step 720 and scrolls in a speed corresponding to the strength of an input signal in step 730. In step 740, the analyzer 120 determines whether a digital signal has been received. Upon input of a digital signal, the analyzer 120 determines whether the digital signal has been produced by combining sensors in step 750. If it has, the analyzer 120 performs a combination input operation in step 760.

Then, the analyzer 120 determines whether data has been received successively in step 770. If it has, the analyzer 120 performs a successive input operation in step 780. The analyzer 120 checks the pressure level of the input signal in step 790. If the pressure level is equal to or greater than a threshold, the analyzer 120 performs a pressure-related operation in step 800. Then, the analyzer 120 determines whether time taken for the input is equal to or longer than a predetermined time in step 810. If it is, the analyzer 120 determines that a short key has been input and invokes a corresponding function in step 820. In step 830, the analyzer 120 determines whether an analog signal has been received. Upon receipt of an analog signal, the procedure returns to step 720 and otherwise, it returns to step 750.

The main feature of the glove-type data input device is that it determines whether an input mode is a digital one or an analog one according to the type of input data, to thereby interface a user with a terminal reliably. Since the digital input mode and the analog input mode are discriminated, the probability of malfunction is reduced by appropriately setting the sensitivity of sensors and other parameters. Therefore, the glove-type data input device is applicable to (1) a portable phone with a small number of key buttons;

(2) a PDA (Personal Digital Assistant) that requires carrying a keyboard or has limitations in data input using a touch screen or a keypad;

(3) a game device that requires a joystick including a few key buttons for receiving directional movement inputs. To function as the key buttons, sensor #2 receives analog input data and sensors #6, 7 and 8 receive key inputs, as described before; and (4) an in-vehicle navigation system that does not allow a driver to use his hands freely while driving.

In accordance with the present invention as described above, the glove-type data input device is made of cloth. Thus, it is portable and facilitates data input for a small-size terminal. It can be also used for gaming since input strength can be controlled by use of a pressure sensor. Considering all data inputs are made manually, the glove-type data input device is very easy to use because it is designed in accordance with human engineering.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A glove-type data input device comprising:
    a sensor unit shaped into fingers, for sensing a change of a glove shape or a position change, and a resulting pressure at at least one contact surface, and outputting a predetermined sensing signal according to the sensing;
    an analyzer for determining input data by analyzing the sensing signal; and
    an output port for outputting a determination result to an external terminal,
    wherein the sensor unit includes five sensors, each positioned at a tip of a finger, and at least one of the sensors is an analog input mode sensor including four sensor tips for sensing left, right, up and down directions and
    wherein a vector sum according to an area over which the analog input mode sensor is pressed in an analog input mode indicates a scroll direction.

2. The glove-type data input device of claim 1, wherein the analyzer includes a database including data information corresponding to each sensing signal.

3. The glove-type data input device of claim 1, wherein the analog input mode sensor surrounds the finger, is tapered in a direction of the tip of the finger, and senses input data as digital data when at least three of the sensor tips are pressed.

4. The glove-type data input device of claim 1, wherein the analyzer determines an input mode by combining signals received from the sensors and converts the signals to an input signal to the terminal in the determined input mode.

5. The glove-type data input device of claim 1, further comprising a transmitter for wirelessly transmitting the analysis result to the terminal.

6. A method of determining input data by analyzing signals from sensors, at least one of the sensors being a direction sensor in a glove-type data input device, comprising the steps of:
    (1) determining an input mode of the glove-type data input device if the glove-type data input device is connected to a terminal and initialized;
    (2) sensing a scroll direction, scrolling in a speed corresponding to a strength of an input signal, and determining whether a digital signal has been received if the input mode is an analog input mode;

(3) determining whether the digital signal has been produced by using the sensors in combination, upon receipt of the digital signal in the sensing step (2) or in the case that the input mode is a digital input mode, and performing a combination input operation if the digital signal has been produced by using the sensors in combination;

(4) performing a successive input operation if it is determined that data has been received successively via the input signal;

(5) checking a power level of the input signal and performing a pressure-related operation if the power level is equal to or greater than a threshold; and (6) determining whether an analog signal has been received if the power level is less than the threshold, or after the checking step (5), returning to the sensing step (2) upon receipt of the analog signal, and returning to the determining step (3) if the analog signal has not been received.

7. The method of claim 6, wherein before it is determined whether the analog signal has been received in the determining step (6), it is determined whether time taken for the input is equal to or longer than a predetermined time and it is determined that a short key has been input if the time taken for the input is equal to or longer than the predetermined time, and a predetermined function is invoked.

8. The method of claim 6, wherein the input mode is toggled between the digital input mode and the analog input mode when the sensors are pressed simultaneously a predetermined number of times.

9. A glove-type data input device comprising:
a sensor unit shaped into fingers, for sensing a change of a glove shape or a position change, and a resulting pressure at least one contact surface, and outputting a predetermined sensing signal according to the sensing;
an analyzer for determining input data by analyzing the sensing signal; and
an output port for outputting a determination result to an external terminal,
wherein the sensor unit includes five sensors, each positioned at a tip of a finger, and at least one of the sensors is an analog input mode sensor including four sensor tips positioned around the finger for sensing left, right, up and down directions.

* * * * *